United States Patent [19]

Thyssen

[11] Patent Number: 5,730,260

[45] Date of Patent: Mar. 24, 1998

[54] SHOCK ABSORBER

[75] Inventor: Cornelius Carel Johannes Thyssen, Edleen, South Africa

[73] Assignee: New Joules Engineering (Sales) (Proprietary) Limited, Edenvale, South Africa

[21] Appl. No.: 899,753

[22] Filed: Jul. 24, 1997

Related U.S. Application Data

[63] Continuation of Ser. No. 600,223, Feb. 12, 1996, abandoned.

[30] Foreign Application Priority Data

| Feb. 10, 1995 | [ZA] | South Africa | 95/1096 |
| Sep. 28, 1995 | [ZA] | South Africa | 95/8164 |

[51] Int. Cl.⁶ .................................................. F16F 9/49
[52] U.S. Cl. .................... 188/266.5; 188/62; 188/282.8
[58] Field of Search .................................. 188/280, 281, 188/282, 322.15, 317, 62, 32; 267/64.26; 104/26

[56] References Cited

U.S. PATENT DOCUMENTS

| 1,401,111 | 12/1921 | Sigel | 188/282 |
| 1,471,560 | 10/1923 | Langford | 188/282 |
| 1,543,098 | 6/1925 | Carter et al. | 188/282 |
| 1,563,169 | 11/1925 | Daniel et al. | 188/282 |
| 2,472,841 | 6/1949 | Ochs | 188/322.15 |
| 4,307,875 | 12/1981 | Schnitzius et al. | 188/282 X |
| 4,474,271 | 10/1984 | Molders et al. | 188/282 X |
| 4,721,189 | 1/1988 | Bick | 188/62 X |
| 5,595,269 | 1/1997 | Beck | 188/282 |

Primary Examiner—Lee W. Young
Attorney, Agent, or Firm—Reid & Priest L.L.P.

[57] ABSTRACT

A shock absorber comprises a cylinder defining a cavity between a pair of end walls. A piston rod extends axially through one of the end walls, and a piston is mounted on the piston rod between the end walls so as to divide the cavity into first and second working chambers containing a damping fluid. A first array of passages extends through the piston and communicates between the first and second chambers, and a sprung valve assembly is provided for obturating the first array of passages in the event of the velocity of the piston rod relative to the cylinder exceeding a predetermined value. A second array of passages communicates between the working chambers and provides a fluid flow path when the first array of passages is blocked by the sprung valve assembly. Restricted exhaust orifices communicate with the second array of passages for limiting the flow of fluid through the second array of passages so as to control the movement of the piston rod. The dimensions of the exhaust orifices are determined in accordance with the desired force-displacement profile of the shock absorber. This shock absorber typically forms part of a rail retarder for controlling the speed of wagons in the marshalling yards and the like.

15 Claims, 6 Drawing Sheets

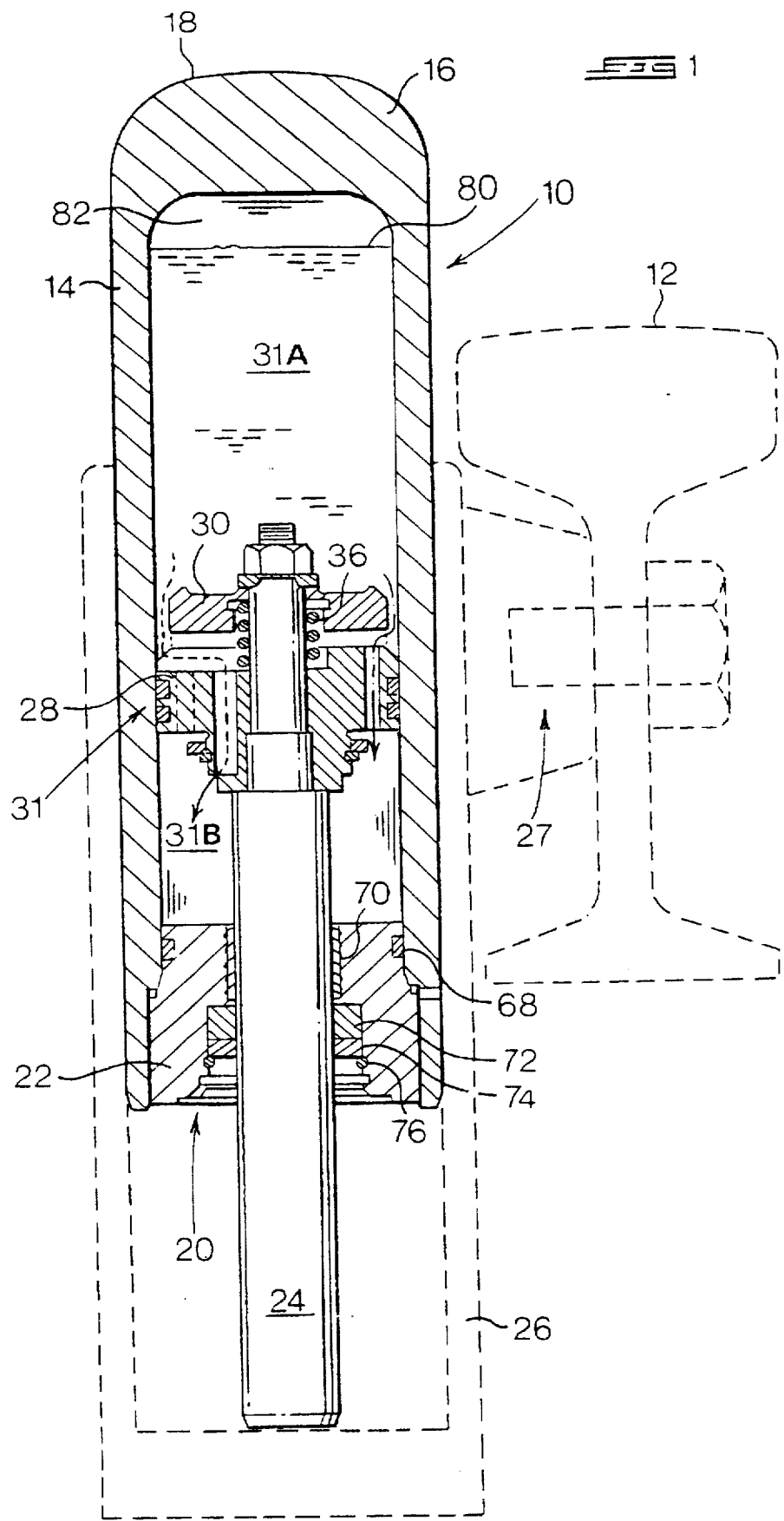

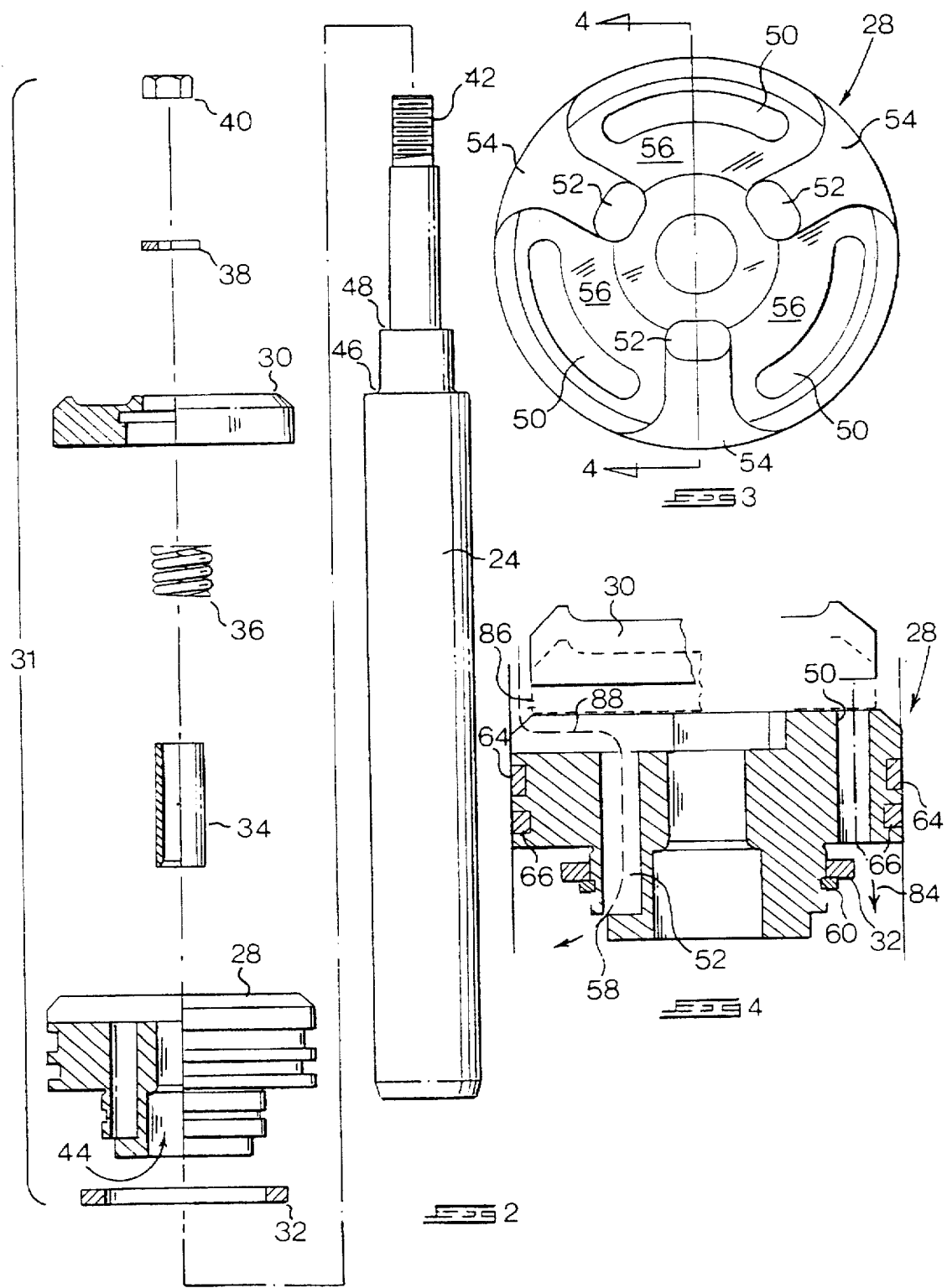

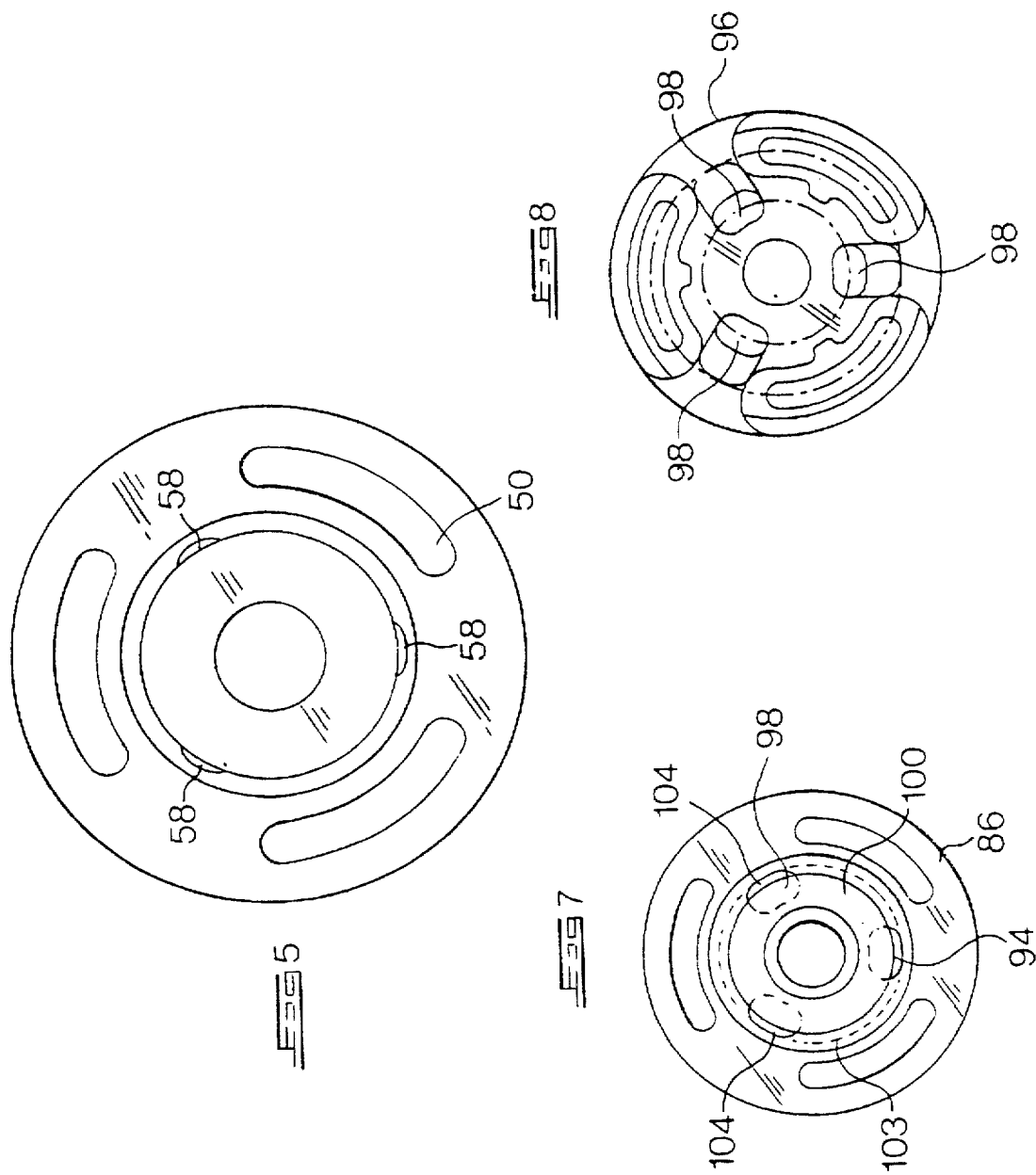

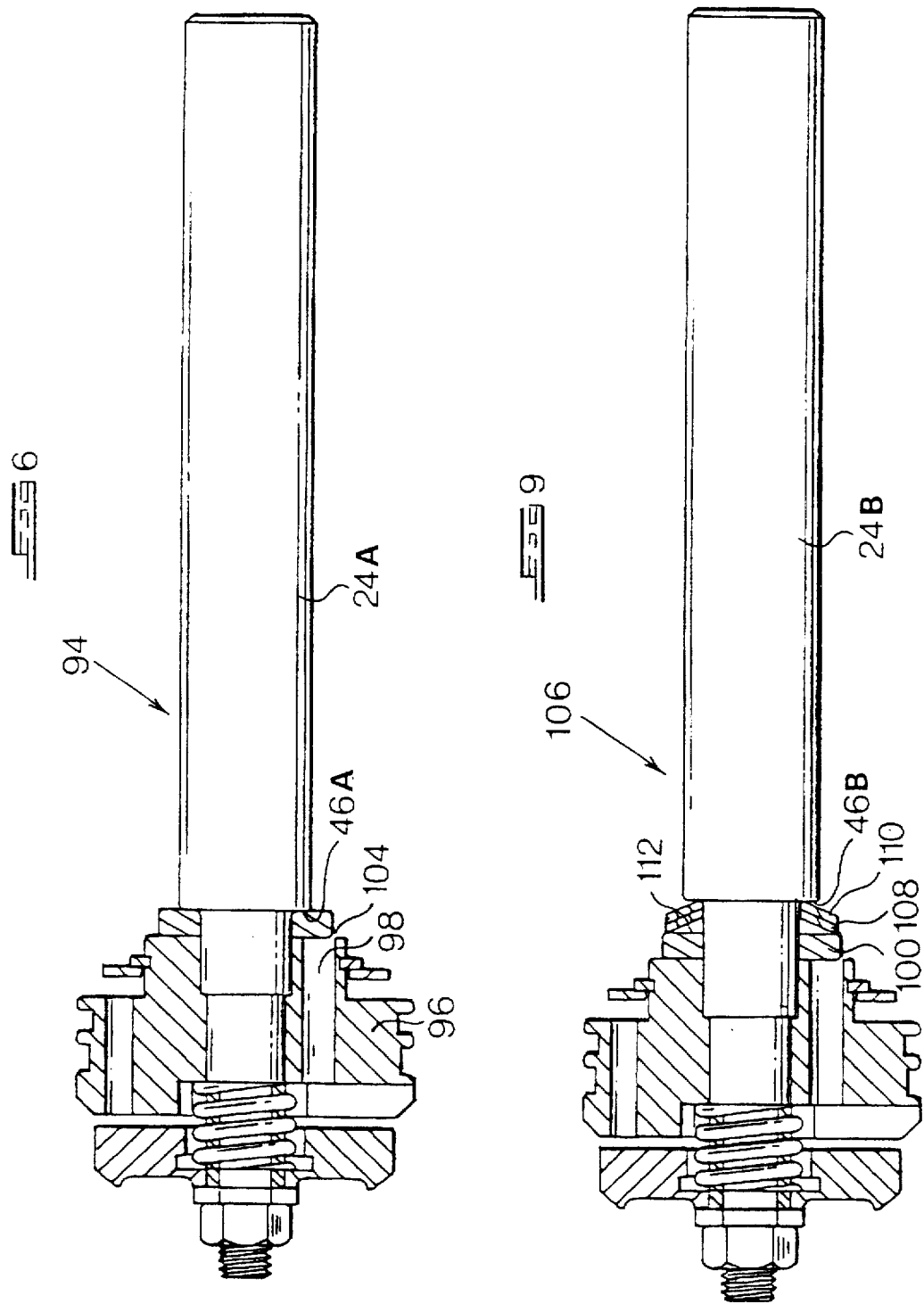

SHOCK ABSORBER

This is a continuation of U.S. application Ser. No. 08/600,223, filed Feb. 12, 1996, now abandoned.

BACKGROUND TO THE INVENTION

THIS invention relates to a shock absorber, and in particular to a shock absorber used as a wagon retarder of the type in which movement of a wagon wheel along a rail is opposed by the retarder acting against the periphery of the wheel.

Various different types of wagon retarders are presently in use in marshalling yards throughout the world to ensure that the wagons do not exceed a predetermined speed. One form of shock absorber used as a wagon retarder comprises a fluid-containing cylinder having a piston rod passing through one end thereof. The piston rod terminates in a piston, which divides the cylinder into two working chambers. The working chambers are in turn connected across the piston by first and second arrays of branch passages. First and second spring-biased valves are arranged to open or close the respective first and second arrays of branch passages. The movement of the cylinder relevant to the piston rod is damped in dependency on the relative velocities of the cylinder and piston rod. The first array of branch passages is open up to a predetermined velocity and is closed by the first valve when such velocity is exceeded. The second array of branch passages is closed by the second relief valve up to a predetermined pressure differential between the working chambers and is opened once the pressure differential is exceeded.

The second relief valve is biased closed by means of high pressure springs, which tend to collapse at high temperatures. The springs and other moving components of the relief valve are wearing components which require regular maintenance and replacement.

It is critical to keep and end load roughly equivalent to the minimum axle load of a wagon. Universally, this is equal to around two tons per wheel, or four tons per axle. If the end load exceeds this, it results in wheel lift of up to 90 mm, which will in turn cause derailment of the wagon. While existing rail retarders of the type described can control wagon speeds at 5 $ms^{-1}$ or lower, at the critical pull-out stage where locomotives pull wagon trains from the sidings, speeds of 10 $ms^{-1}$ or higher can be attained. Where the tracks are fitted with conventional rail retarders set to a typical wagon coupling speed of 1 to 1.5 $ms^{-1}$, the corresponding end load setting will result in excessive wheel lift and derailing in the case of a wagon travelling at 10 $ms^{-1}$ or more.

SUMMARY OF THE INVENTION

According to the invention there is provided a shock absorber comprising:

a) a cylinder defining a cavity between a pair of end walls;

b) a piston rod extending axially through one of the end walls;

c) a piston mounted on the piston rod between the end walls, the piston dividing the cavity into two working chambers arranged to contain damping fluid;

d) at least one first passage extending through the piston and communicating between the working chambers;

e) spring biased valve means for obturating the first passage in the event of the velocity of the piston rod relative to the cylinder in a first axial direction exceeding a predetermined value;

f) a second passage communicating between the working chambers and providing a fluid flow path when the first passage is obturated; and g) a restricted exhaust orifice communicating with the second passage for limiting the flow of fluid through the second passage.

The restricted exhaust orifice is preferably defined by means of a separate orifice plate arranged to abut an opening in the second passage, with the outer diameter of the plate defining the size of the exhaust orifice.

Preferably, the dimensions of the orifice are determined in accordance with the desired force-displacement profile of the shock absorber, and are designed to allow a pressure differential to exist between the working chambers for damping a force applied to the shock absorber. In the case of a separate orifice plate, the dimensions of the exhaust orifice may be varied by varying the outer diameter of the orifice plate.

Typically, the shock absorber includes a return valve for partly restricting the return flow of fluid in an opposed axial direction for limiting the velocity of a return stroke of the piston relative to the cylinder.

In one for of the invention, the orifice plate is mounted rigidly against a rearmost face of the piston, with the orifice plate having no freedom of movement.

In an alternative preferred form of the invention, biasing means are provided for biasing the orifice plate against the rearmost face of the piston, the biasing means being arranged to allow the orifice plate only to open in response to a predetermined threshold force on the shock absorber. This force is typically in excess of 20 kN, and is preferably in excess of 22 kN.

The invention extends to a wagon retarder comprising a shock absorber according to any one of the preceding claims, in which the cylinder is formed with an upper percussion surface shaped and positioned to act against the outer edge of a wagon wheel, the retarder further including a cylindrical housing within which the cylinder is slidably mounted and against which a free end of the piston rod abuts, and mounting means for mounting the cylindrical housing to a rail.

BRIEF DESCRIPTION OF THE DRAWINGS

FIG. 1 shows a cross-sectional side view of a first embodiment of a shock absorber of the invention;

FIG. 2 shows a partly cross-sectional exploded view of a piston assembly forming part of the shock absorber of FIG. 1;

FIG. 3 shows a top plan view of a piston head forming part of the piston assembly of the first embodiment of the invention;

FIG. 4 shows a cross-section through the piston head on the line 4—4 in FIG. 3;

FIG. 5 shows an underplan view of the piston head;

FIG. 6 shows a partly cross-sectional side view of a piston assembly forming part of a second embodiment of the shock absorber of the invention;

FIG. 7 shows an underplan view of a piston head and orifice plate forming part of the piston assembly of FIG. 6;

FIG. 8 shows a top plan view of the piston head of FIG. 7;

FIG. 9 shows a partly cross-sectional side view of a third embodiment of a piston assembly of the invention;

DESCRIPTION OF EMBODIMENTS

Figure 10A:
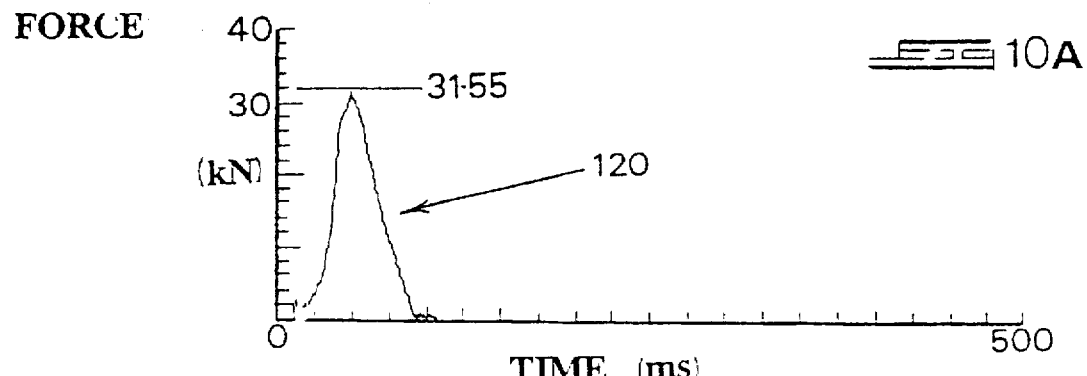
FIGS. 10A & 10B show respective graphs of force and stroke against time for an active stroke of the shock absorber of FIG. 6.
Figure 10B:
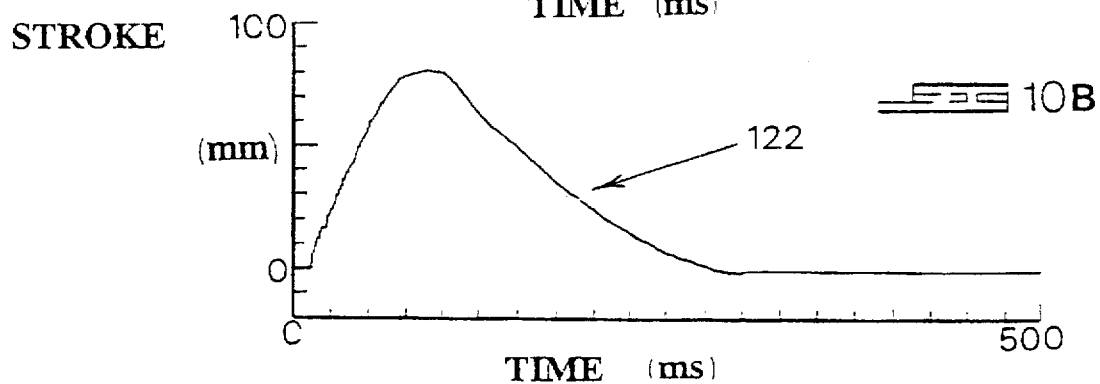

Referring first to FIG. 1, a wagon retarder 10 is shown bolted to a rail 12 in a marshalling yard. The wagon retarder 10 comprises a cylinder 14 having an upper closed end 16 with a rounded upper percussion surface 18 shaped to act against the outer edge of a wagon wheel. The opposite open end 20 of the cylinder is fitted with a gland nut 22 having a central aperture through which a piston rod 24 extends. The lower end of the piston rod 24 abuts against the base of a cylindrical housing 26. Both the piston rod 24 and the housing are stationary, and the cylinder 14 is mounted slidably within the housing 26. The housing 26 is in turn bolted to the rail 12, as is shown at 27.

A piston head 28 is mounted to the opposite end of the piston rod 24, and a valve disc 30 is similarly mounted on the end of the piston rod 24 above the piston head, so as to form a piston assembly 31 dividing the cylinder cavity into upper and lower working chambers 31A and 31B. FIG. 2 shows clearly how the piston assembly 31 is stacked onto the end of the piston rod 24. An annular restrictor valve 32 is positioned over the piston rod, followed by the piston head 28, a tubular spacing bush 34, a coil spring 36 and the valve disc 30 which is biassed upwardly into the open position by means of a coil spring 36. The entire valve assembly is held in position by means of a washer 38 and a nut 40, which is screwed over a topmost threaded portion 42 of the piston rod 24. The piston head 28 is formed with a central stepped aperture 44, which is arranged to seat in a complemental fit on stepped shoulders 46 and 48 formed on the piston rod 24.

Referring now to FIGS. 3 to 5, the piston head 28 is formed with three equi-spaced outer arcuate passageways 50 which extend completely through the piston head 28 and which communicate with the upper and lower chambers 31A and 31B. Also extending through the piston head are three equi-spaced inner passages 52 which alternate with and are recessed relative to the outer three passages 50. Recessed channels 54 extend radially from the uppermost opening of each of the passages 52, and define raised platforms 56 for the upper vents of the first passages 50. As can clearly be seen in FIGS. 4 and 5, each of the second passages 52 are formed with a lowermost restricted exhaust orifice 58, which only allows limited flow of damping fluid between the upper and lower working chambers 31A and 31B. The manner in which the orifices operate to restrict the flow of damping fluid will be described in more detail further on in the specification.

The restrictor valve 32 is held loosely captive by means of a circlip 60. The piston head 28 is fitted with piston rings in the form of respective brass and PTFE rings 64 and 66, thereby providing an effective seal between the two working chambers 31A and 31B. As is clear from FIG. 1, the gland nut 22 is fitted with an annular rubber sealing ring 68 providing a tight seal between the outer surface of the nut and the walls of the cylinder 14. A glacier bush 70, a dynamic oil seal 72 and a back-up washer 74 provide an effective seal between the piston rod 24 and the gland nut 22, with the dynamic seal and the back-up washer being retained by means of a spring clip 76.

In operation, the wagon retarder works as follows. Both working chambers 31A and 31B are charged with oil up to a level 80, with a pocket of nitrogen gas 82 being located above the oil level 80 and being arranged to compress on initial application of a force to the uppermost percussion surface 18 of the cylinder. In response to the application of force via the wagon wheel, the cylinder 14 commences a downward stroke, during which hydraulic fluid starts flowing from the upper chamber 31A to the lower chamber 31B via the passageways 50, as is indicated by chain line 84. After the cylinder 14 has reached a predetermined velocity by the application of increased force arising from the wagon wheel travelling at around 5 ms$^{-1}$, the valve disc 30 moves downwards against the action of the compression spring 36 to a closed position indicated in broken outline at 86. Consequently, the lowermost surface of the valve disc 30 blocks off the passageways 50, and the only route which the oil can follow from the upper to the lower changers is in the direction of broken line 88, via the channels 54, the second relief passages 52 and out through the restricted exhaust orifices 58.

A pressure build up will occur as a result of the exhaust orifices only allowing a relatively limited flow of oil into the lower chamber, and the resultant pressure differential between the upper and lower chambers 31A and 31B will act to dampen the downward movement of the cylinder. The extent of pressure build-up and the displacement-force profile of the shock absorber can be controlled by varying the size of the exhaust orifices. In order to limit the return stroke of the cylinder once the wagon wheel has passed over the cylinder, the annular restrictor valve 32 moves upwardly under influence of the return flow to partly obturate the passages 50, thereby reducing flow back into the upper chamber 31A. The nitrogen reservoir 82 acts as a gas spring to assist in returning the cylinder into its original extended position.

In determining the size of the exhaust orifice, the wagon retarder is mounted on a test ramp and the required back pressure is measured by a wagon travelling at the determined speed. Electronic measurement equipment is used to measure the stroke in millimeters and a load cell is used to measure the end load in kN. A speed setting is obtained from the same equipment by means of taking the differences between an idle stroke, where only the gas pressure operates, and the hydraulic pressure arising from a full downward stroke of the cylinder.

Referring now to FIGS. 6 to 8, a second embodiment of a piston assembly 94 is shown. Those components which are similar to the components of the previously illustrated piston assembly are indicated with identical numerals.

Instead of having integrally formed restricted exhaust orifices, a piston head 96 is formed with three equi-spaced cylindrical passages 98 and a separate orifice plate 100 is interposed between a rearmost face 102 of the piston head 86 and the shoulder 46A of the piston rod 24A. As is clear from FIG. 9, the diameter of the orifice plate 100 is slightly less than the diameter of an imaginary orifice plate indicated in broken outline at 103 which would completely block off the three passages 98. As a result, three exhaust orifices 104 are defined. It can clearly be seen how the sizes of those exhaust orifices can be readily adjusted by the orifice plate 100 so as to allow for different displacement-force profiles. The shock absorbing properties of the piston assembly 94 can thus easily be adjusted by replacement of the orifice plate 100 with a plate of different diameter.

Referring now to FIG. 9, a preferred "relaxable orifice" embodiment of a piston assembly 106 is shown in which a pack of plate springs comprising two plate springs 108 and 110 is interposed between the trailing face 112 of the orifice plate 100 and the shoulder 46B of the piston rod 24B. In this particular embodiment, the pack of plate springs is adjusted so that the orifice plate 100 begins to open when the force applied to the shock absorber exceeds 22 kN so as to allow damping fluid to be dumped more rapidly into the working chamber 31B. Naturally, the force at which the orifice plate 100 opens can be adjusted by varying the number as well as the resilient properties of the plate springs and the pack of plate springs.

In applications where the shock absorber is used in marshalling yards as a wagon retarder to ensure that the wagons do not exceed a predetermined speed, the opening force can be adjusted so as to correspond to a predetermined percentage increase above the desired speed limit. For example, if the wagons in the marshalling yard have a speed limit of 5 ms$^{-1}$, then the wagon retarders may be set to that the orifice plate begins to open when wagons travel at 6 ms$^{-1}$ or over, which is 20% in excess of the desired speed. A speed of 6 ms$^{-1}$ would typically correspond to a force of 22 kN.

For normal operating speeds within 20% of the set speed, the exhaust orifice is operative. It is only once the speed exceeds 20% of the set speed that the pack of plate springs starts to be compressed, thereby levelling out the force-displacement response curve and ensuring that there is no force peak significantly in excess of 2 tons, which could lead to derailment of the wagon. In contrast to the prior art rail retarders utilizing packs of plate springs over their entire range, a pack of plate springs of the present embodiment of the invention only operates occasionally when the speed limit is exceeded, thereby reducing wear and consequent maintenance of the pack.

The rail retarders illustrated in FIGS. 6 and 9 were tested on a Thyssen retarder testing machine. This machine is programmed to simulate the actual downward speed of the retarder caused by a wagon having a specific linear speed, wheel diameter and wheel load, so as to assist in measuring the exact end load, the energy expended and the required speed setting of the rail retarder.

A first series of seven test runs tabulated below in Table 1 was used to approximate the velocity at which the valve disc 30 was closing. This was found to be around 4,204 ms$^{-1}$. The first column indicates the calculated energy expended on each downward stroke, the second column indicates the measured end load in kN, and the third column indicates the forward velocity of travel on the wagon.

Test runs 1 and 5 to 7 indicate the idling energy at a point just before closing the disc valve. This was measured to be 61 Nm. Further test runs 8 to 30 were then conducted by a computer controlled programme to establish the performance of the lower retarder, and in particular the performance tolerances on speed settings around 4.205 ms$^{-1}$. The results are summarised in Table 2, from which it can be seen that the respective minimum and maximum tolerances are given at 4.15 ms$^{-1}$ and 4.75 ms$^{-1}$ where the test units had been set to 4.2 ms$^{-1}$. A tolerance of 0.064% was obtained. At a maximum speed of 4.4 ms$^{-1}$, the maximum working energy at this speed was measured as being 1394 Nm at an end load of 17.4 kN. At a speed of 4.2 ms$^{-1}$ and a flow of 233 l/min through all exhaust orifices, the pressure through each orifice when the valve closed was found to be 5 MPa at 100 l/min, with the nitrogen pressure of 650 kPa and 238 ml of oil contained within the retarder. With these parameters, the energy at 4.25 ms$^{-1}$ was measured as being 1240 J.

TABLE 1

| Test Number | Energy (Nm) | Force (kN) | Velocity (ms)$^{-1}$ |
|---|---|---|---|
| 1 | 62 | | 4.265 |
| 2 | 1394 | 17.4 | 4.409 |
| 3 | 1276 | 15.6 | 4.269 |
| 4 | 1197 | 15.2 | 4.204 |
| 5 | 62 | | 4.135 |
| 6 | 63 | | 4.176 |
| 7 | 63 | | 4.222 |
| 8 | 1127 | 15.2 | 4.261 |
| 9 | 1202 | 15.2 | 4.235 |
| 10 | 1207 | 15.1 | 4.212 |
| 11 | 57 | | 4.176 |
| 12 | 59 | | 4.195 |
| 13 | 1166 | 15.6 | 4.219 |
| 14 | 63 | | 4.216 |
| 15 | 60 | | 4.238 |
| 16 | 1193 | 16.4 | 4.256 |
| 17 | 63 | | 4.248 |
| 18 | 1243 | 16.4 | 4.264 |
| 19 | 1240 | 15.7 | 4.247 |
| 20 | 1219 | 15.7 | 4.202 |
| 21 | 62 | | 4.168 |
| 22 | 1053 | 1115.2 | 4.19 |
| 23 | 61 | | 4.172 |
| 24 | 65 | | 4.189 |
| 25 | 1167 | 15.8 | 4.221 |
| 26 | 1231 | 15.4 | 4.205 |
| 27 | 1196 | 15.4 | 4.162 |
| 28 | 59 | | 4.135 |
| 29 | 58 | | 4.158 |
| 30 | 1147 | 15.5 | 4.187 |

TABLE 2

| | MIN ALLOWABLE | MAX ALLOWABLE | ACTUAL MEASURED | MAX MEASURED | DEV | STD. DEV |
|---|---|---|---|---|---|---|
| Velocity (ms) | 4.15 | 4.75 | 4.205 | | .043% | |
| Idling Energy (Nm) | | 70 | 61 | | | 2.3 |
| Working Energy (Nm) | 1216 | | | 1394 | | |
| Working Force (kN) | | 24 | 15.7 | | | .6 |
| Drift on speed valve closure | | .2% | | | .064% | |

Referring now to FIG. 10A, a graph 120 shows a plot of force against time for an active stroke of the rail retarder of FIGS. 6 to 8 corresponding to a linear speed of 4.270 ms$^{-1}$. The maximum force was 31.55 kN, which occurred after a time period of approximately 25 ms. In a second graph 122, the stroke or displacement of the rail retarder was plotted against time, with a maximum displacement of 81.7 mm being reached after a time period of approximately 80 ms.

Figure 10C:
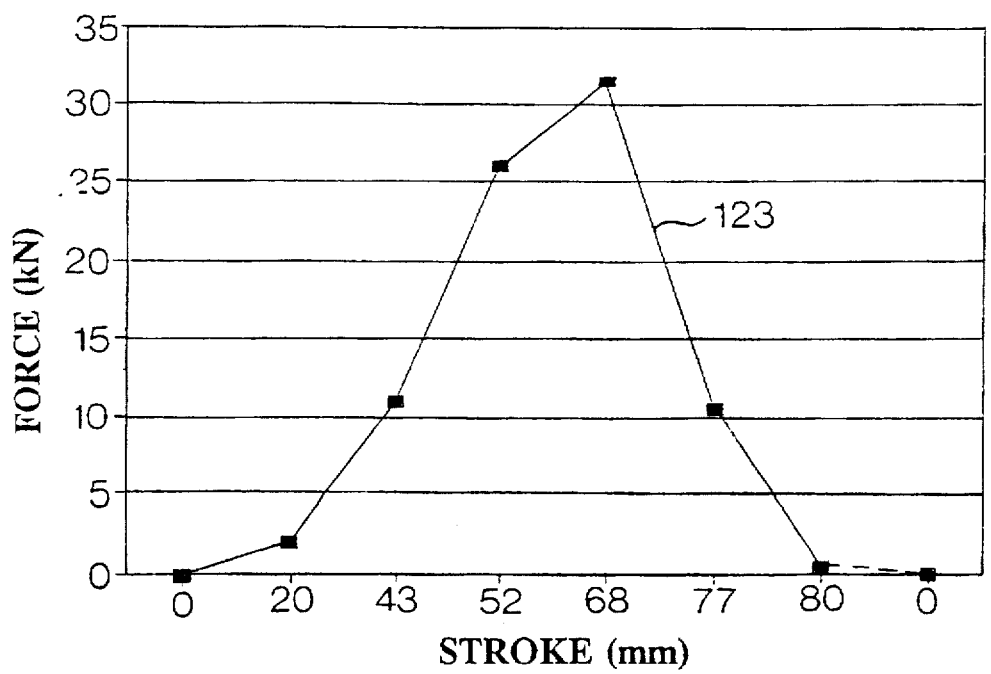
FIG. 10C shows a plot of force against stroke taken from the graphs of FIGS. 10A and 10B.

In FIG. 10C, a plot combining the graphs 120 and 122 is shown, indicating force plotted against stroke, from which it is clear that a maximum force of 31.55 kN was reached after a stroke of approximately 68 mm, with the force then reducing significantly towards maximum stroke or displacement of approximately 80 mm is reached. It can clearly be seen how the force peaks and decays sharply relative to the displacement. The resultant area enclosed by the graph represents the energy expended, in which the total displacement is summed against the loads causing the displacement. From this or a test graph, actual and designed force parameters can be compared for a particular displacement. The size of the exhaust orifices can then be adjusted until the correct force-displacement profile is obtained.

Figure 11A:
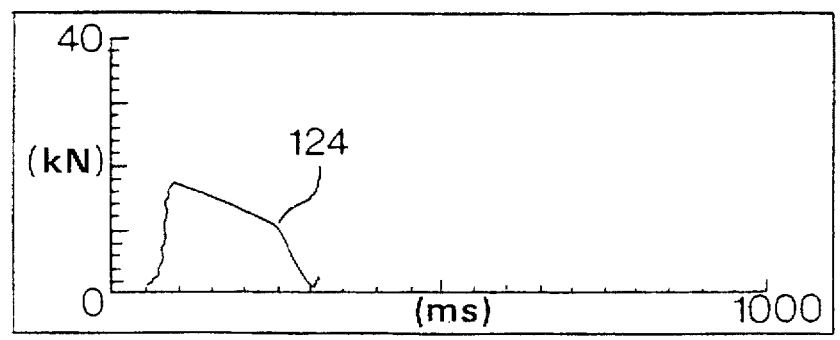
FIGS. 11A & 11B show respective graphs of force and stroke against time for an active stroke of the shock absorber of FIG. 9.
Figure 11B:
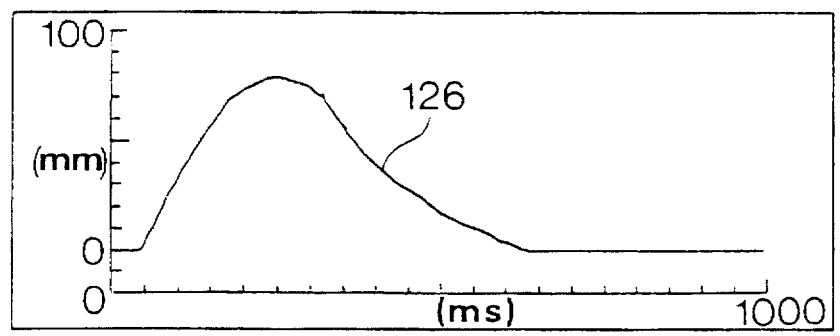

Turning now to FIG. 11A, first graph 124 shows a plot of force against time for an active stroke of the rail retarder of FIG. 9 incorporating the pack of plate springs and corresponding to a linear speed of 1.256 ms$^{-1}$. The maximum force of 17.57 kN occurred after a time period of approximately 90 ms. In FIG. 11B, a second graph 126 shows the stroke or displacement of the rail retarder plotted against time, with a maximum displacement of 78.6 mm being reached after a time period of approximately 250 ms.

Figure 11C:
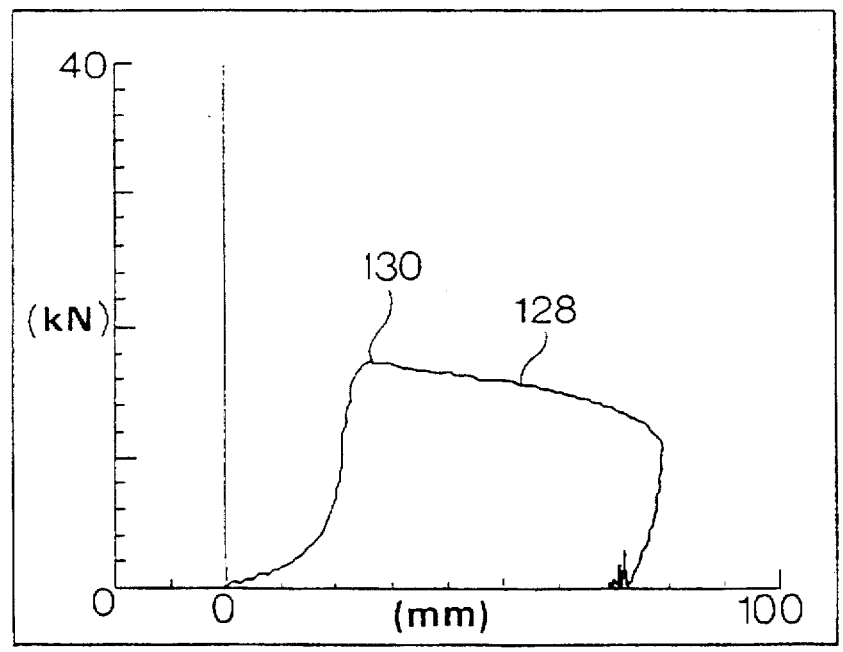
FIG. 11C shows a graph of force against a stroke taken from the graphs of FIGS. 11A and 11B.

In FIG. 11C, the two graphs 124 and 126 are combined into a single force-displacement graph. It should be noted from this force-displacement graph, that in contrast to the force-displacement graph of FIG. 10C, which displays a relatively sharp peak at around 31.55 kN, the force-displacement graph 128 peaks at 17.57 kN at 130, and decays gradually so as to distribute the absorption of energy (represented by the area under the graph 128) more evenly. The smoothing effect of the pack of plate springs can clearly be seen in the gradual decay of the graph. The pack compresses so as to ensure that there is no force overshoot or peak in excess of 2 tons or 20 kN, which could lead to derailment.

The restricted orifices replace an entire prior art relief valve assembly and all the associated wearing components which are prone to failure, such as high pressure springs, which tend to collapse at high temperatures. In the case of the relaxable orifice embodiment, the pack of plate springs is not prone to wear, as it does not operate during a normal duty cycle when the wagons travel within the desired speed limits, and only compresses under abnormal load conditions when the wagons exceed the desired speed limit. No relief valve is required, and the energy absorption capabilities can be preset by adjusting the sizes of the exhaust orifices, typically by replacing orifice plates and thereby reducing maintenance. Only one wear component, namely the valve disc 30, is employed, thereby significantly reducing the component count. The overall length of the piston assembly is reduced as a result of not having to provide a separate relief valve. Consequently, longer active strokes can be achieved using cylinders of the same dimensions.

I claim:

1. A shock absorber comprising:

a) a pair of end walls;

b) a cylinder defining a cavity between the pair of end walls;

c) a piston rod extending axially through one of the end walls;

d) a piston mounted on the piston rod between the end walls, the piston dividing the cavity into first and second working chambers arranged to contain damping fluid;

e) a first passage extending through the piston and communicating between the first and second working chambers;

f) a second passage extending through the piston and providing permanent communication between the first and second working chambers;

g) valve means for closing the first passage in the event of the velocity of the piston rod relative to the cylinder in a first axial direction exceeding a predetermined value while leaving the second passage open; and h) a permanently open exhaust orifice communicating with the second passage, the exhaust orifice being restricted so as to limit the flow of fluid through the second passage so as to control the movement of the piston rod when the first passage is closed, the dimensions of the exhaust orifice being determined in accordance with the desired force-displacement profile of the shock absorber, and being designed to allow a pressure differential to exist between the first and second working chambers for allowing the shock absorber to apply a pre-determined damping force.

2. A shock absorber according to claim 1 in which the restricted exhaust orifice is defined by means of a separate orifice plate arranged to abut and to partly obturate an opening in the second passage so as to define the exhaust orifice.

3. A shock absorber according to claim 2 in which the dimensions of the exhaust orifice are variable, and are determined by varying an outer diameter of the orifice plate.

4. A shock absorber according to claims 3 in which the orifice plate is mounted rigidly against an operatively rearmost face of the piston, with no freedom of movement.

5. A shock absorber according to claim 3 in which the orifice plate is movable, and first biasing means are provided for biasing the orifice plate against the rearmost face of the piston, the biasing means being arranged to allow the orifice plate only to open in response to a predetermined threshold force on the shock absorber.

6. A shock absorber according to claim 5 in which the first biasing means comprises a pack of plate springs.

7. A shock absorber according to claim 5 in which the predetermined threshold force is greater than 20 kN.

8. A shock absorber according to claim 1 in which the restricted exhaust orifice is formed integrally with the piston.

9. A shock absorber according to claim 1 which further includes a return valve for partly restricting the return flow of fluid in an opposed axial direction for limiting the velocity of a return stroke of the piston relative to the cylinder.

10. A wagon retarder comprising a shock absorber according to claim 1, in which the cylinder is formed with an upper percussion surface shaped and positioned to receive a load, the retarder further including a cylindrical housing within which the cylinder is slidably mounted and against which a free end of the piston rod abuts, and mounting means for mounting the cylindrical housing to a stationary object.

11. A shock absorber according to claim 1 in which the permanently open restricted exhaust orifice is restricted relative to the second passage so as to limit the flow of fluid through the second passage.

12. A shock absorber according to claim 11 in which:

the first passage has a first orifice opening into the first working chamber and a second orifice opening into the second working chamber, the valve means are arranged to close against the first orifice, the second passage has a first orifice opening into the first working chamber, and the restricted exhaust orifice opens into the second working chamber.

13. A shock absorber according to claim 1 further comprising second biasing means for biasing the valve means into an open position, the second biasing means being selected in accordance with the predetermined velocity value.

14. A shock absorber according to claim 9 in which:

the permanently open restricted exhaust orifice is restricted relative to the second passage so as to limit the flow of fluid through the second passage, the first passage has a first orifice opening into the first working chamber and a second orifice opening into the second working chamber, the valve means are arranged to close against the first orifice, the second passage has a first orifice opening into the first working chamber, the restricted exhaust orifice opens into the second working chamber, and the return valve is arranged to partly obturate the second orifice of the first passage.

15. A shock absorber according to claim 1 in which the first passage comprises three equi-spaced outer passageways and the second passage comprises three equi-spaced inner passageways located inwardly of the outer passageways.

* * * * *